3,394,177
SELECTIVE PREPARATION OF 2,4,6,8 - TET-
RACHLORO - 2,4,6,8 - TETRAPHENYLTETRA-
PHOSPHONITRILE
Bernard Grushkin, Silver Spring, and Rip G. Rice, Ash-
ton, Md., assignors to W. R. Grace & Co., New York,
N.Y., a corporation of Connecticut
No Drawing. Filed May 25, 1964, Ser. No. 370,047
5 Claims. (Cl. 260—543)

The present invention relates to the preparation of 2,4, 6,8-tetrachloro - 2,4,6,8 - tetraphenyltetraphosphonitriles, and more specifically to an improved process for preparing large proportions of 2,4,6,8-tetrachloro-2,4,6,8-tetraphenyltetraphosphonitriles from the reaction of phenyltetrachlorophosphorane with finely divided ammonium chloride.

It is generally known that phenyl tetrachlorophosphorane ($\phi PCl_4$) will react with ammonium chloride ($NH_4Cl$) to produce mixtures of 2,4,6,8-tetrachloro-2,4, 6,8-tetraphenyltetraphosphonitriles $[NP\phi Cl]_4$ and 2,4,6-trichloro - 2,4,6 - triphenyltriphosphonitriles $[NP\phi Cl]_3$. Using the heretofore disclosed reaction conditions and solvents, it is found that the formation of the trimeric $[NP\phi Cl]_3$ is favored. Hence, to date only minor amounts of the valuable tetrameric polymer forming intermediate have been prepared.

It is therefore an object of the present invention to provide a method by which substantial yields of $[NP\phi Cl]_4$ may be prepared.

It is another object to provide a feasible commercial process by which large proportions of $[NP\phi Cl]_4$ may be prepared by reacting $\phi PCl_4$ with finely divided $NH_4Cl$.

These and still further objects of the present invention will become readily apparent to one skilled in the art from the following detailed description and specific examples.

Broadly, the present invention contemplates an improved process for preparing $[NP\phi Cl]_4$ which comprises reacting $\phi PCl_4$ with finely divided $NH_4Cl$ in the presence of a solvent having a dielectric constant greater than about 15 at a temperature of from about 100–215° C.

More specifically, we have found that if a solvent having a dielectric constant greater than about 15 is used in the reaction employing finely divided $NH_4Cl$:

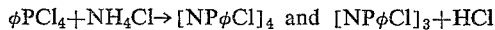

the reaction favoring tetramer formation is enhanced to the extent that in excess about 70% $\phi PCl_4$ reacting forms tetramer. Such a result is totally unexpected in view of the fact that heretofore used chlorinated hydrocarbon solvents, having substantially lower dielectric constants, favor the formation of trimer over the tetramer to the extent of about 10 to 1.

Preferably, the present process is carried out by first establishing a suspension of finely divided ammonium chloride in solvent-suspension medium having the preferred dielectric constant greater than about 15. This suspension is preferably prepared by passing gaseous ammonia ($NH_3$) and hydrogen chloride (HCl) into an agitated body of the desired suspension medium. Subsequently, a solution of phenyltetrachlorophosphorane in the same solvent is added to the suspension, and the mixture is agitated and heated at a temperature of 100–170° C. for a period of from about 40 to about 80 hours depending on the amount of $\phi PCl_4$ present. During this reaction time well over 90% of the phenyltetrachlorophosphorane will react, and of the reacting phenyltetrachlorophosphorane over 70% thereof will enter into the formation of the desired tetramer. It is frequently found that the molar ratio of tetramer to trimer prepared in accordance with this method will average in excess of about 4 to 1.

As mentioned, above, the solvents, or more accurately termed liquid reaction media solvents, used in the practice of the present invention possess a dielectric constant of from about 15 to about 30 when measured at 100° C. to 215° C. For convenience in carrying out the reaction these solvents should possess a boiling point in excess of about 100° C. Furthermore, these solvents should not possess substituents which are reactive toward the reactants or products of the reaction. Typical solvents which possess the desired dielectric constants are aromatic compounds such as nitrobenzene and nitrotoluene and nitroaliphatics such as chloropicrin, nitromethane and nitroethane. These desired solvents are characterized by the following general structural formula:

$$R\text{-}(NO_2)_x$$

wherein R may represent a phenyl, alkylphenyl, halophenyl, or alkyl or substituted alkyl radical, and $x$ represents the number of nitro substituents present which may vary from about 1 to 3.

It is found that the present reaction produces most satisfactory results when the ammonium chloride used to form the suspension possesses an average particle size of below about 10 microns. Ammonium chloride having particle size in this desired range is most readily obtained by reacting gaseous ammonia and hydrogen chloride in the presence of the liquid reaction media used to conduct the reaction. Alternatively, the reaction between the gaseous ammonia and hydrogen chloride may be conducted in the gaseous phase in the presence of an inert sweep gas, such as nitrogen, and the ensuing mixture of ammonium chloride particles in nitrogen is conducted into the liquid reaction media.

It is also contemplated that ammonium chloride having the desired particle size range may be prepared by mechanically grinding commercially available ammonium chloride. Such mechanical grinding however, is tedious and time consuming and is frequently attendant with the incorporation of undesired impurities.

The amount of ammonium chloride present in the liquid reaction medium is not particularly critical, so long as a sufficient amount is present to react with the phenyltetrachlorophosphorane added to the mixture. As a general rule of thumb, it is found that from about 0.1 to about 4 moles of ammonium chloride per liter of reaction medium will readily produce a suspension suitable for the practice of the present invention. To this suspension is added up to about 2 moles of phenyltetrachlorophosphorane. Thus, it is seen that in the preferred practice of the present invention a molar excess ranging of from about 1.5 to about 3 moles of ammonium chloride is present for each mole of phenyltetrachlorophosphorane.

The preferred reaction temperatures used in the practice of the present invention range from about 100–215° C. At these reaction temperatures it is found that a smooth rapid reaction progresses which frequently is substantially complete within about 60 hours depending on the temperature and concentration used. However, to insure completeness of reaction, it is generally preferred to extend the reaction period for a time ranging of from about 12 to about 24 hours.

The phenyltetrachlorophosphorane used in the practice of the present invention may be conveniently obtained by chlorinating phenyldichlorophosphine in the presence of the reaction medium used in the practice of the present invention. A typical synthesis of the required phenyltetrachlorophosphorane involves bubbling chlorine gas through a solution of phenyldichlorophosphine dissolved in the reaction medium to be used in the practice of the invention. This results in a solution of phenyltetrachlorophosphorane in the desired reaction solvent which contains from about 0.1 to about 1 mole of phenyltetrachlorophosphorane per liter of solvent. This resultant solution may be conveniently added to the ammonium chloride suspension which is previously prepared.

Following reaction for the required time, the reaction mixture is worked up to recover the $[NP\phi Cl]_4$ from the non-reacted ammonium chloride and the small amount of trimer which is present. The excess ammonium chloride, as well as any traces of unreacted phenyltetrachlorophosphorane, is removed by washing the reaction mixture with water. Subsequently, the organic layer which contains the desired tetramer, along with some trimer, may be dried by means of azeotropic distillation or by means of a suitable absorbent. Subsequent removal of the organic solvent by distillation under reduced pressure leaves a solid product which will comprise the trimer and the tetramer. Separation of the trimer and the tetramer may be effectively carried out by fractional crystallization from solvent pairs such as benzene-pentane or chloroform-hexane. Since the tetramers are less soluble in these solvent pairs then are the trimers, the tetramers will crystallize first. Further additions of aliphatic hydrocarbon solvent will induce subsequent crystallization of the trimeric materials if any are present.

Another method for separating the mixture of trimeric and tetrameric products involves continuously extracting a mixture of the two with an aliphatic hydrocarbon solvent having up to about 6 continuous carbon atoms and a boiling point of less than about 90° C., such as pentane or hexane. An extraction apparatus, such as Soxhlet extractor, may be used to carry out the extraction. The more soluble trimeric materials are extracted into the aliphatic solvent, leaving the more insoluble tetrameric material in the extraction apparatus. After separation of the respective trimer and tetramer, these products may be further purified by recrystallization from suitable solvents in a conventional manner.

The tetrameric materials obtained in the practice of the present invention find utility in formation of inorganic type polymers. The 4 chloro substituents present on the phosphonitrilic ring enable numerous linking and crosslinking reactions to occur when reacted with polyamino and polyhydroxy containing compounds.

Having described the general aspects of the present invention, the following examples are given to illustrate embodiments thereof.

Example I 200 mmoles of $\phi PCl_2$ in 100 ml. of nitrobenzene was chloroinated to $\phi PCl_4$ by passing chlorine gas therethrough until the solution turned a bright yellow. Nitrogen gas was then bubbled through the solution to remove excess chlorine. This solution was then slowly added to a slurry of finely divided ammonium chloride in 2,000 ml. of nitrobenzene at 131° C. during a 48 hr. period. This ammonium chloride suspension in 2,000 ml. of nitrobenzene was prepared by passing gaseous ammonia and HCl into the nitrobenzene until about 0.5 mole of ammonium chloride had formed. Heating of the reaction mixture was continued for 79 hrs. whereupon 93.2% of the theoretical HCl evolved from the reaction mixture.

Analysis of the product indicated that 32 mmoles of $[NP\phi Cl]_4$ and 9 mmoles of $[NP\phi Cl]_3$ had formed. The overall yield of tetramer based on $\phi PCl_4$ reacted was 64%, whereas that of trimer was only 13.5%.

Example II 500 mmoles of $\phi PCl_4$, prepared as described in Example I, in 500 ml. of nitroethane was slowly added to a slurry of finely divided $NH_4Cl$ in 1.0 l. of nitroethane at 114° C. After 100 hrs. no more HCl evolved. Analysis of the cyclic products showed 80% tetramer and 20% trimer were obtained.

Example III

To illustrate the effect that selection of a semi-polar solvent has on tetramer formation, the following example was run using chlorobenzene (Dielectric Constant=5.6 at 20° C.) as the reaction solvent.

A solution of 0.20 mole of $\phi PCl_2$ in 350 ml. of chlorobenzene was chlorinated until the solution turned bright yellow, indicating completion of the reaction. Nitrogen was then passed through the soltuion until it turned water white indicating removal of the excess chlorine.

Gaseous ammonia and gaseous hydrogen chloride were passed simultaneously into 2700 ml. of rapidly agitated chlorobenzene until at least 0.40 mole of $NH_4Cl$ had been prepared. This slurry was then heated to reflux then the solution of $\phi PCl_4$ then was added at the rate of about 1 drop/second under a nitrogen atmosphere. Evolved HCl was swept into a water trap by means of the nitrogen stream and titrated intermittently with standard NaOH.

Periodically throughout the reaction 10 ml. samples of solution were withdrawn. These were washed well with water, dried, made to volume and analyzed by infrared spectroscopy to determine the trimer (very strong absorption at 1200 cm.$^{-1}$) and tetramer (very strong absorption at 1300 cm.$^{-1}$) contents. The results are tabulated below. A double beam infrared instrument was used in order to cancel absorption due to the solvent.

| Sample No.: | Time After Start (Min.) | Percent Completion | Infrared Analysis | |
|---|---|---|---|---|
| | | | mmoles Trimer | mmoles Tetramer |
| 1 | 42 | 8.6 | 7.56 | |
| 2 | 87 | 22.9 | 14.8 | |
| 3 | 132 | 31.8 | 21.7 | 2.39 |
| 4 | 170 | 44.9 | 28.8 | 3.44 |
| 5 | 241 | 56.7 | 38.7 | 3.44 |
| 6 | 294 | 74.1 | 42.3 | 4.47 |
| 7 | 320 | 94.1 | 47.6 | 5.14 |
| 8 | 2,667 * | 100 | 59.8 | 5.76 |

* All $\phi PCl_4$ had been added in 349 minutes (5.83 hrs.).

These data correspond to a total of 179.4 mmoles phosphorus due to trimer (89% yield) and 23.04 mmoles of phosphorus due to tetramer (11% yield); total mmoles of phosphorus 202.4 (theoretical 200.0).

The above specific examples clearly indicate that substantial yields of 2,4,6,8-tetrachloro-2,4,6,8-tetraphenyltetraphosphonitriles may be obtained by practice of the present invention.

We claim:
1. The process of preparing 2,4,6,8-tetraphenyl-2,4,6, 8-tetrachlorotetraphosphonitrile which comprises reacting phenyltetrachlorophosphorane with finely divided ammonium chloride in the presence of a solvent having a dielectric constant greater than about 15 at a temperature of from about 100–215° C., and recovering the 2,4, 6,8-tetrachloro - 2,4,6,8 - tetraphenyltetraphenylphosphonitrile formed thereby.

2. The process of claim 1 wherein the solvent is selected from the group consisting of nitrobenzene, nitrotoluene, chloropicrin, nitromethane, nitroethane and nitropropanes.

3. The process of claim 2 wherein said ammonium chloride possesses an average particle size of below about 10 microns.

4. The process of claim 3 wherein said ammonium chloride is prepared by combining gaseous ammonia and gaseous hydrogen chloride in the presence of said solvent.

5. The process of preparing 2,4,6,8-tetrachloro-2,4,6,8-tetraphenyltetraphosphonitrile which comprises reacting gaseous ammonia and gaseous hydrogen chloride in the presence of a liquid medium selected from the group consisting of nitrobenzene, nitrotoluene, chloropicrin, nitromethane, nitroethane or a nitropropane to establish a suspension of finely divided ammonium chloride in said medium, adding phenyltetrachlorophosphorane to said suspension maintained at a temperature of from about 100–215° C., agitating the resultant mixture for a period of from about 20 to about 100 hours at said temperature, and recovering the 2,4,6,8-tetrachloro-2,4,6,8-tetraphenyltetraphosphonitrile formed thereby.

References Cited

UNITED STATES PATENTS 3,234,273  2/1966  Rice et al. _____ 260—543

LORRAINE A. WEINBERGER, *Primary Examiner.*

H. C. WEGNER, *Assistant Examiner.*